US011425293B2

(12) United States Patent
Hozumi

(10) Patent No.: US 11,425,293 B2
(45) Date of Patent: Aug. 23, 2022

(54) IMAGE PROCESSING APPARATUS, IMAGE CAPTURING APPARATUS, INFORMATION PROCESSING APPARATUS, IMAGE PROCESSING METHOD, AND COMPUTER-READABLE STORAGE MEDIUM

(71) Applicant: CANON KABUSHIKI KAISHA, Tokyo (JP)

(72) Inventor: Yasushi Hozumi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/518,814

(22) Filed: Nov. 4, 2021

(65) Prior Publication Data

US 2022/0150391 A1 May 12, 2022

(30) Foreign Application Priority Data

Nov. 9, 2020 (JP) .............................. JP2020-186748

(51) Int. Cl.
 *H04N 5/225* (2006.01)
 *H04N 5/235* (2006.01)
 (Continued)

(52) U.S. Cl.
 CPC ........... *H04N 5/2256* (2013.01); *G06T 7/586* (2017.01); *G06T 7/593* (2017.01); *G06V 10/60* (2022.01);
 (Continued)

(58) Field of Classification Search
 CPC ..................... G06T 7/593; G06T 7/586; G06T 2207/10152; H04N 2013/0081;
 (Continued)

(56) References Cited

U.S. PATENT DOCUMENTS

2009/0027503 A1* 1/2009 Yoshioka ............... H04N 17/00
 348/180
2009/0279807 A1* 11/2009 Kanamori ............ G02B 5/3025
 348/222.1
(Continued)

FOREIGN PATENT DOCUMENTS

JP 2017-150878 A 8/2017

*Primary Examiner* — Chiawei Chen
(74) *Attorney, Agent, or Firm* — Cowan, Liebowitz & Latman, P.C.

(57) ABSTRACT

An acquisition unit acquires light source information specifying a virtual light source, normal line information indicating a normal line distribution in a shooting range, and normal line error information indicating a normal line error region in which an error has occurred in the normal line distribution. A first generation unit generates first gain information indicating a first gain amount distribution, based on the light source information and the normal line information. A second generation unit generates second gain information indicating a second gain amount distribution, by performing smoothing processing on a gain amount of a region, which corresponds to the normal line error region, in the first gain amount distribution. An addition unit adds an effect of the virtual light source to an image of the shooting range based on the second gain amount distribution.

9 Claims, 12 Drawing Sheets

(51) Int. Cl.
*H04N 5/222* (2006.01)
*G06V 10/60* (2022.01)
*G06T 7/586* (2017.01)
*G06T 7/593* (2017.01)

(52) U.S. Cl.
CPC ......... *H04N 5/2224* (2013.01); *H04N 5/2354* (2013.01)

(58) Field of Classification Search
CPC .. H04N 5/2256; H04N 5/2224; H04N 5/2354; H04N 5/2621; G06V 10/60
See application file for complete search history.

(56) References Cited

U.S. PATENT DOCUMENTS

| | | | |
|---|---|---|---|
| 2015/0189144 A1* | 7/2015 | Yoshii | H04N 13/239 348/46 |
| 2016/0127630 A1* | 5/2016 | Kitajima | H04N 5/2351 348/370 |
| 2017/0206704 A1* | 7/2017 | Inoue | H04N 5/2628 |
| 2019/0004178 A1* | 1/2019 | Motoyama | H04N 13/239 |
| 2019/0213739 A1* | 7/2019 | Ohba | G06V 10/44 |
| 2022/0103797 A1* | 3/2022 | Barbour | G06V 10/10 |

* cited by examiner

FIG. 9
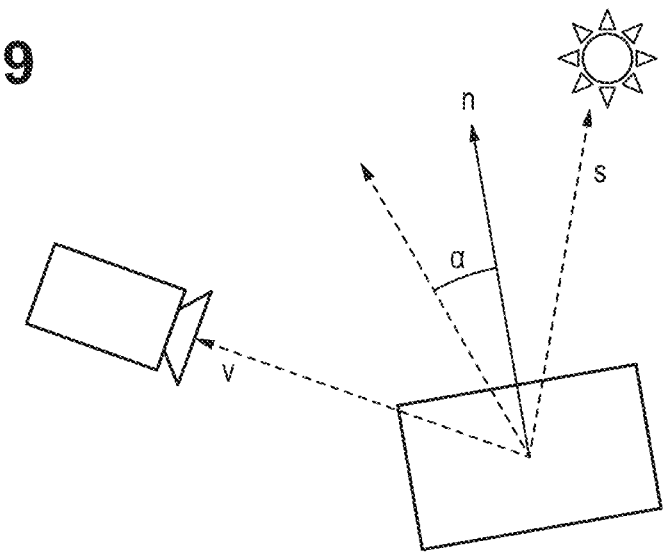
FIG. 10A  EXAMPLE OF VIRTUAL LIGHT SOURCE IMAGE WITH UNNATURAL SHADOW
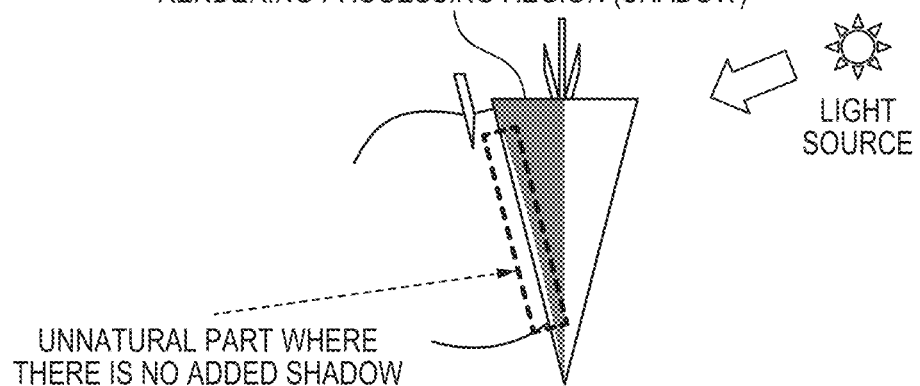
FIG. 10B  EXAMPLE OF VIRTUAL LIGHT SOURCE IMAGE WITH DESIRABLE SHADOW
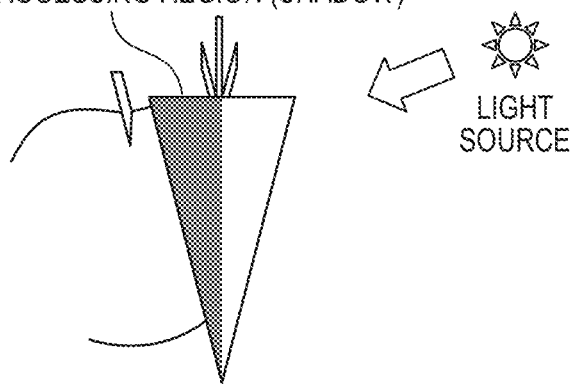

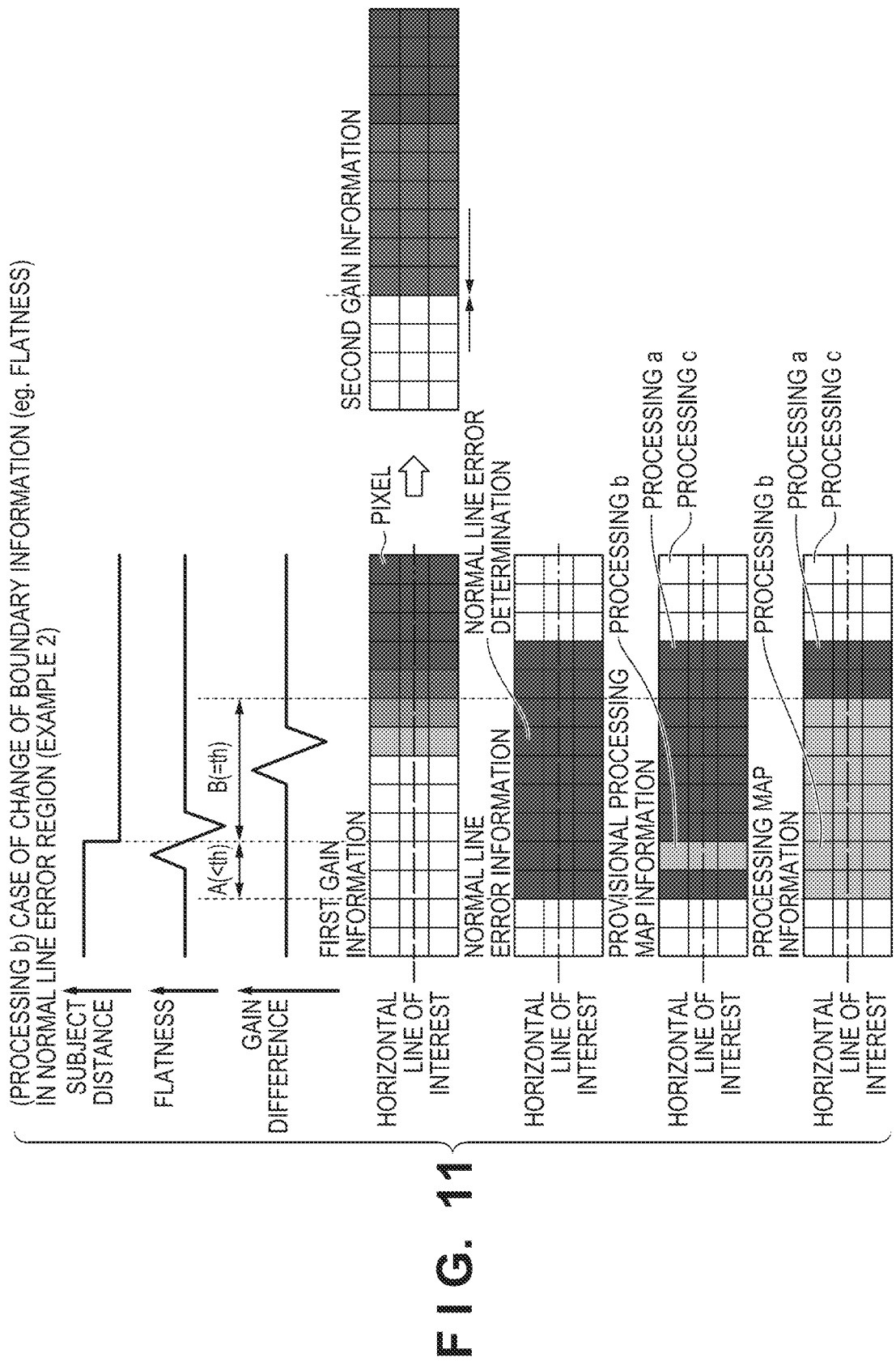
F I G. 11

IMAGE PROCESSING APPARATUS, IMAGE CAPTURING APPARATUS, INFORMATION PROCESSING APPARATUS, IMAGE PROCESSING METHOD, AND COMPUTER-READABLE STORAGE MEDIUM

BACKGROUND OF THE INVENTION

Field of the Invention

The present invention relates to an image processing apparatus, an image capturing apparatus, an information processing apparatus, an image processing method, and a computer-readable storage medium.

Description of the Related Art

A method of acquiring information of a surface normal line (henceforth, "normal line information") as shape information of a subject, from a captured image obtained by capturing an image of the subject with an image capturing apparatus such as a digital camera is known. By utilizing this normal line information at the time of rendering processing, an image, such as a re-lighting image, can be acquired in which the appearance of the subject (in the case of re-lighting, how the shadow falls or how the light hits) has been changed.

A photometric stereo method has been proposed as one method of acquiring such normal line information. The photometric stereo method is a method that involves postulating the reflective characteristics of the subject that are based on the light source direction and the surface normal line of the subject, and determining the surface normal line from the reflective characteristics and luminance information of the subject at a plurality of light source positions. As for the reflective characteristics of the subject in the photometric stereo method, a Lambertian reflectance model that conforms to Lambert's cosine law is often used.

Generally, reflection of an object includes specular reflection and diffuse reflection. Specular reflection is mirror reflection on the object surface, and conforms to Fresnel's formula on the object surface (interface). On the other hand, diffuse reflection is where light is scattered inside the object after passing through the surface of the object and is reflected back.

Light that has been specularly reflected cannot be represented with Lambert's cosine law. Accordingly, when specularly reflected light is included in reflected light from a subject that is observed with an image capturing apparatus, the surface normal line is not correctly obtained with the photometric stereo method.

An error from the postulated reflectance model according to Lambert's cosine law also occurs in shadow parts where the light from the light source does not hit, and thus normal line information of the subject cannot be correctly acquired. Furthermore, an error from the postulated reflectance model according to Lambert's cosine law also occurs in relation to a subject having a surface shape that causes interreflection geometrically, and thus normal line information of the subject cannot be correctly acquired. Hereinafter, regions in which the normal line information of subjects such as the above cannot be correctly derived will be referred to as normal line error regions.

Japanese Patent Laid-Open No. 2017-150878 describes being able to reduce noise that is included in luminance information and eliminate errors in the normal line information caused by noise, when acquiring normal line information from luminance information by the photometric stereo method.

Although the technology of Japanese Patent Laid-Open No. 2017-150878 is able to suppress errors in normal line information caused by noise included in the luminance information, this technology is, however, not able to suppress errors in the aforementioned specularly reflected light, shadow parts, and normal line information caused by inter-reflection, and thus normal line error regions arise. In the case where a virtual light source image is formed in which the appearance of the subject has been changed based on normal line information including such a normal line error region, the state of shadow may be unnatural in the normal line error region, as shown in FIG. 10A, for example.

SUMMARY OF THE INVENTION

The present invention has been made in view of such circumstances, and provides a technology for suppressing image quality degradation of virtual light source images caused by normal line error regions.

According to a first aspect of the present invention, there is provided an image processing apparatus comprising at least one processor and/or at least one circuit which functions as: an acquisition unit configured to acquire light source information specifying a virtual light source, normal line information indicating a normal line distribution in a shooting range, and normal line error information indicating a normal line error region in which an error has occurred in the normal line distribution; a first generation unit configured to generate first gain information indicating a first gain amount distribution, based on the light source information and the normal line information; a second generation unit configured to generate second gain information indicating a second gain amount distribution, by performing smoothing processing on a gain amount of a region, which corresponds to the normal line error region, in the first gain amount distribution; and an addition unit configured to add an effect of the virtual light source to an image of the shooting range, by applying a gain conforming to the second gain amount distribution to the image.

According to a second aspect of the present invention, there is provided an image capturing apparatus comprising: the image processing apparatus according to the first aspect; and an image sensor configured to generate the image.

According to a third aspect of the present invention, there is provided an information processing apparatus comprising at least one processor and/or at least one circuit which functions as: an acquisition unit configured to acquire first normal line information indicating a first normal line distribution which is a normal line distribution in a shooting range and normal line error information indicating a normal line error region in which an error has occurred in the first normal line distribution; and a generation unit configured to generate second normal line information indicating a second normal line distribution, by performing smoothing processing on a normal line of the normal line error region in the first normal line distribution.

According to a fourth aspect of the present invention, there is provided an image processing method executed by an image processing apparatus, comprising: acquiring light source information specifying a virtual light source, normal line information indicating a normal line distribution in a shooting range, and normal line error information indicating a normal line error region in which an error has occurred in the normal line distribution; generating first gain information indicating a first gain amount distribution, based on the light source information and the normal line information; generating second gain information indicating a second gain amount distribution, by performing smoothing processing on a gain amount of a region, which corresponds to the normal line error region, in the first gain amount distribution; and adding an effect of the virtual light source to an image of the shooting range, by applying a gain conforming to the second gain amount distribution to the image.

According to a fifth aspect of the present invention, there is provided a non-transitory computer-readable storage medium which stores a program for causing a computer to execute an image processing method comprising: acquiring light source information specifying a virtual light source, normal line information indicating a normal line distribution in a shooting range, and normal line error information indicating a normal line error region in which an error has occurred in the normal line distribution; generating first gain information indicating a first gain amount distribution, based on the light source information and the normal line information; generating second gain information indicating a second gain amount distribution, by performing smoothing processing on a gain amount of a region, which corresponds to the normal line error region, in the first gain amount distribution; and adding an effect of the virtual light source to an image of the shooting range, by applying a gain conforming to the second gain amount distribution to the image.

Further features of the present invention will become apparent from the following description of exemplary embodiments with reference to the attached drawings.

BRIEF DESCRIPTION OF THE DRAWINGS

FIG. 9 is a diagram illustrating a specular reflection component.

FIG. 10A is a diagram showing an example of a virtual light source image with unnatural shadow.

FIG. 10B is a diagram showing an example of a virtual light source image with desirable shadow.

FIG. 11 is a diagram illustrating processing b in gain information correction processing (Example 2).

DESCRIPTION OF THE EMBODIMENTS

Figure 1:
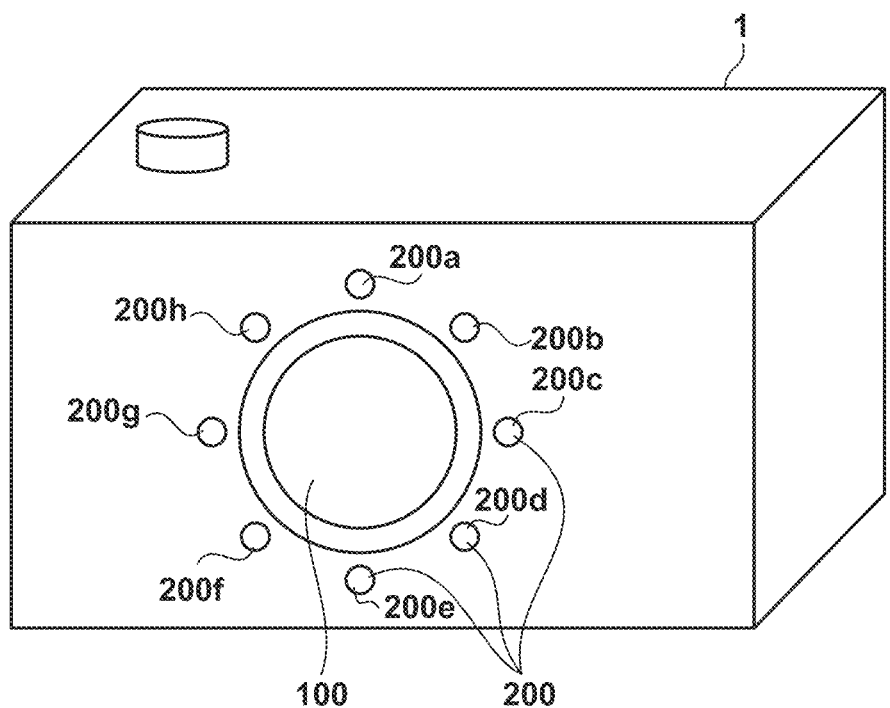
FIG. 1 is an external view of an image capturing apparatus 1.

Hereinafter, embodiments of the present invention will be described with reference to the attached drawings. Elements that are given the same reference numerals throughout all of the attached drawings represent the same or similar elements, unless otherwise specified. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

First Embodiment

Photometric Stereo Method

The photometric stereo method is the method that involves postulating the reflective characteristics of the subject that are based on the direction from the subject to the light source (light source direction) and the surface normal line of the subject, and computing surface normal line information, based on the postulated reflective characteristics and luminance information of the subject corresponding to a plurality of light source positions. If reflectance is not uniquely determined when a predetermined surface normal line and the position of the light source are provided, the reflective characteristics need only be approximated with a Lambertian reflectance model conforming to Lambert's cosine law. As shown in FIG. 9, the specular reflection component is dependent on an angle $\alpha$ between a surface normal line n and the bisector of a light source vector s and a gaze direction vector v. Accordingly, the reflective characteristics may be characteristics that are based on the gaze direction. Also, with regard to luminance information, the influence of light (ambient light, etc.) other than the light source may be removed by capturing an image of each subject when the light source is ON and when the light source is OFF, and taking the difference therebetween.

Hereinafter, the case where the reflective characteristics are postulated with a Lambertian reflectance model will be described. A luminance value i is shown by the following formula 1 from Lambert's cosine law, where i is the luminance value of reflected light, pa is the Lambertian diffuse reflectance of the object, E is the intensity of the light source, s is the unit vector (light source direction vector) indicating the direction from the object to the light source, and n is the unit surface normal line vector of the object.

Formula 1

$$i = E\rho_d s \cdot n \quad (1)$$

Formula 1 is shown by the following formula 2, where $s_1, s_2, \ldots, s_M$ are respective components of M different light source vectors (M≥3), and $i_1, i_2, \ldots, i_M$ are luminance values of the respective components of the light source vectors.

Formula 2

$$\begin{bmatrix} i_1 \\ \vdots \\ i_M \end{bmatrix} = \begin{bmatrix} s_1^T \\ \vdots \\ s_M^T \end{bmatrix} E\rho_d n \quad (2)$$

The left side of formula 2 is an M×1 luminance vector (M rows, 1 column), the right side $[s_1T, \ldots, s_MT]$ is an M×3 incident light matrix S (M rows, 3 columns) indicating the light source direction, and n is 3×1 unit surface normal line vector (3 rows, 1 column). If M=3, $E\rho_d n$ is shown by the following formula 3, using an inverse matrix $S^{-1}$ of the incident light matrix S.

Formula 3
$$E\rho_d n = S^{-1} \begin{bmatrix} i_1 \\ \vdots \\ i_M \end{bmatrix} \quad (3)$$

The norm of the vector on the left side of formula 3 is the product of the intensity E of incident light and the Lambertian diffuse reflectance $\rho_d$, and the normalized vector is computed as the surface normal line vector of the object. That is, the intensity E of incident light and the Lambertian diffuse reflectance $\rho_d$ only appear in the conditional expression in the form of a product, and thus when $E\rho_d$ is regarded as one variable, formula 3 can be regarded as a simultaneous equation for determining three unknown variables together with the two degrees of freedom of the unit surface normal line vector n. Accordingly, each variable can be determined by acquiring luminance information using at least three light sources. Note that since an inverse matrix does not exist in the case where the incident light matrix S is not a regular matrix, the components $s_1$ to $s_3$ of the incident light matrix S need to be selected such that the incident light matrix S will be a regular matrix. That is, it is desirable to select the component $s_3$ linearly independently of the components $s_1$ and $s_2$.

Also, if M>3, more conditional expressions are obtained than the number of unknown variables to be derived, and thus the unit surface normal line vector n can be computed from three freely selected conditional expressions with a similar method to when M=3. In the case of using four or more conditional expressions, the incident light matrix S is no longer a regular matrix, and thus an approximate solution may be computed using a Moore-Penrose pseudo-inverse matrix, for example. Also, the unit surface normal line vector n may be computed by a fitting technique or an optimization technique.

On the other hand, in the case of deriving normal line information (surface normal line information) in the manner described above, normal line information is not obtained correctly with respect to subjects with specularly reflected light, subjects with shadow parts, and subjects in which interreflection occurs due to surface shape. In normal shooting scenes, there are many situations where, in at least part of the subject, there is a region of the subject in which normal line information such as the above cannot be acquired correctly (normal line error region). In the present embodiment, rendering processing can be favorably implemented, even on subject scenes having this normal line error region, by using a technique that will be described in detail below.

Configuration of Image Capturing Apparatus 1

Figure 2:
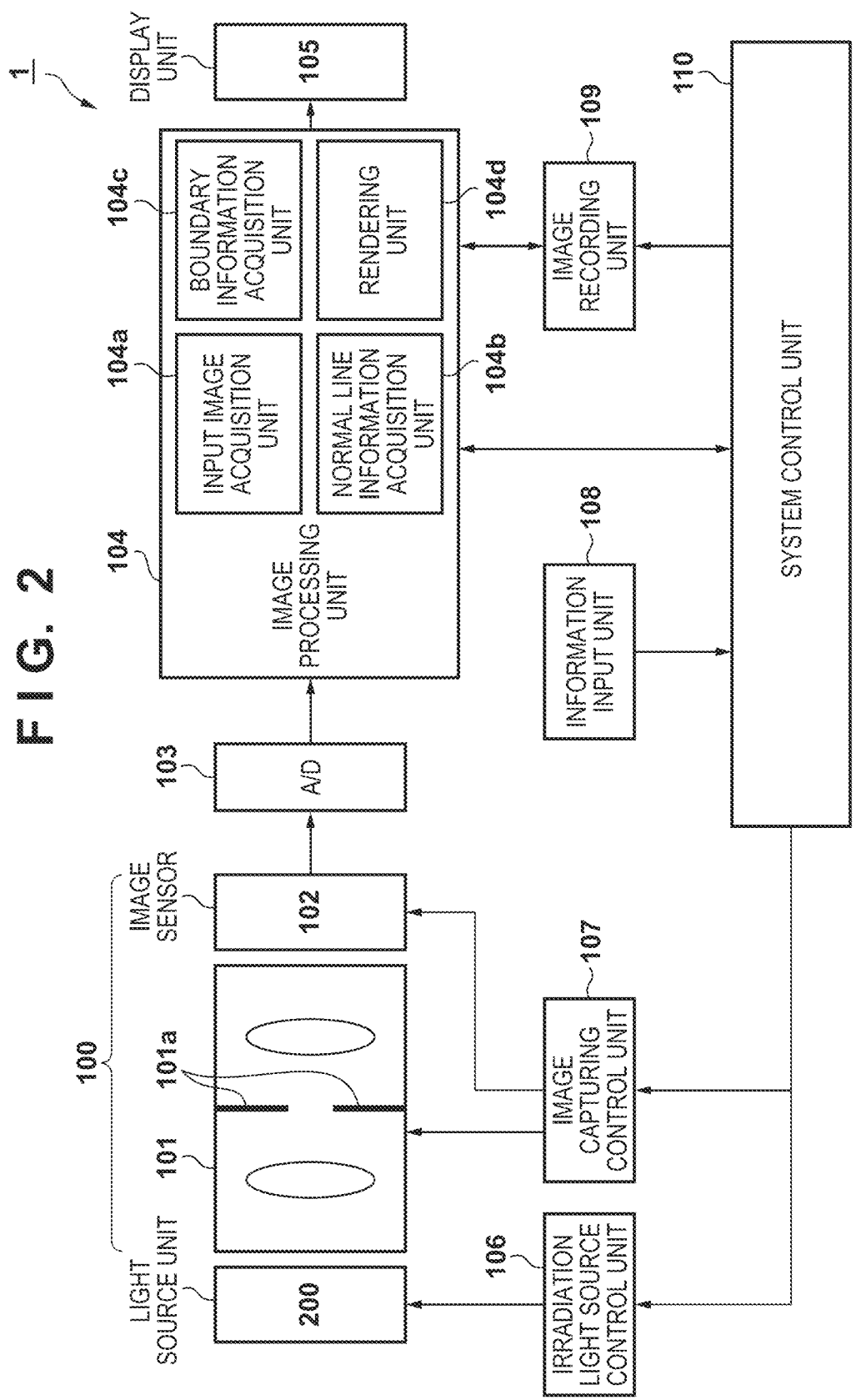
FIG. 2 is a block diagram showing the configuration of the image capturing apparatus 1.

The configuration of an image capturing apparatus 1 will be described with reference to FIGS. 1 and 2. FIG. 1 is an external view of the image capturing apparatus 1. FIG. 2 is a block diagram showing the configuration of the image capturing apparatus 1.

The image capturing apparatus 1 generates a rendering image (re-lighting image) by performing rendering processing. As shown in FIG. 1, the image capturing apparatus 1 has an image capturing unit 100 that captures an image of the subject and a light source unit 200. As shown in FIG. 2, the image capturing unit 100 has an image capturing optical system 101 and an image sensor 102. The light source unit 200 is configured to be able to irradiate a subject with light from a plurality of different positions. In the present embodiment, the light source unit 200 has eight light sources 200a to 200h, but is not limited thereto. Since at least three light sources are required when implementing the photometric stereo method, the light source unit 200 need only be provided with at least three light sources. Also, in the example shown in FIG. 1, the eight light sources are disposed at equal intervals in a concentric circular shape at equidistant positions from the optical axis of the image capturing optical system 101 that is included in the image capturing unit 100, but are not limited thereto. Also, in the example shown in FIG. 1, the light source unit 200 is incorporated in the image capturing apparatus 1, but is not limited thereto. The light source unit 200 may be constituted to be removably attachable to the image capturing apparatus 1.

The image capturing optical system 101 is provided with a diaphragm 101a, and forms light from the subject into an image on the image sensor 102. The image sensor 102 is constituted by a photoelectric conversion device such as a CCD sensor or a CMOS sensor, and captures an image of the subject. That is, the image sensor 102 photoelectrically converts the image (optical image) of the subject formed by the image capturing optical system 101, and generates an analog electrical signal (image data corresponding to the input image). An A/D converter 103 converts the analog signal generated through photoelectric conversion by the image sensor 102 into a digital signal, and outputs the digital signal to an image processing unit 104.

The image processing unit 104 (processing apparatus) performs various types of image processing on the digital signal input from the A/D converter 103. Also, in the present embodiment, the image processing unit 104 computes normal line information of the subject, and generates a rendering image (re-lighting image) under an arbitrary light source. The image processing unit 104 has an input image acquisition unit 104a, a normal line information acquisition unit 104b, a boundary information acquisition unit 104c, and a rendering unit 104d.

An output image processed by the image processing unit 104 is saved to an image recording unit 109 such as semiconductor memory or an optical disc. Also, the image processing unit 104 may output the output image to a display unit 105 (display). In the present embodiment, the input image acquisition unit 104a, the normal line information acquisition unit 104b, the boundary information acquisition unit 104c and the rendering unit 104d are incorporated in the image capturing apparatus 1, but are not limited thereto, and some of the aforementioned units may be provided separately to the image capturing apparatus 1.

An information input unit 108 supplies shooting conditions (aperture value, exposure time, ISO speed, focal length, etc.) selected by the user to a system control unit 110. An image capturing control unit 107 acquires an image under the shooting conditions selected by the user, based on information from the system control unit 110. An irradiation light source control unit 106 controls the light emitting state of the light source unit 200 according to control instructions from the system control unit 110. The information input unit 108 is also provided with a function of supplying light source conditions (virtual light source angle, virtual light source intensity, virtual light source color, etc.) selected by the user to the system control unit 110. The image processing unit 104 generates a rendering image (re-lighting image) under the virtual light source conditions selected by the user, based on information from the system control unit 110. Note that, in the present embodiment, the image capturing optical system 101 is constituted integrally with the image capturing apparatus 1, but is not limited thereto. Instead of the image capturing apparatus 1, it is also possible to use a camera system of a single-lens reflex camera, a mirrorless camera and the like that includes an image capturing apparatus main body having an image sensor and an image capturing optical system (interchangeable lens) removably attachable to the image capturing apparatus main body.

Rendering Processing

Figure 3:
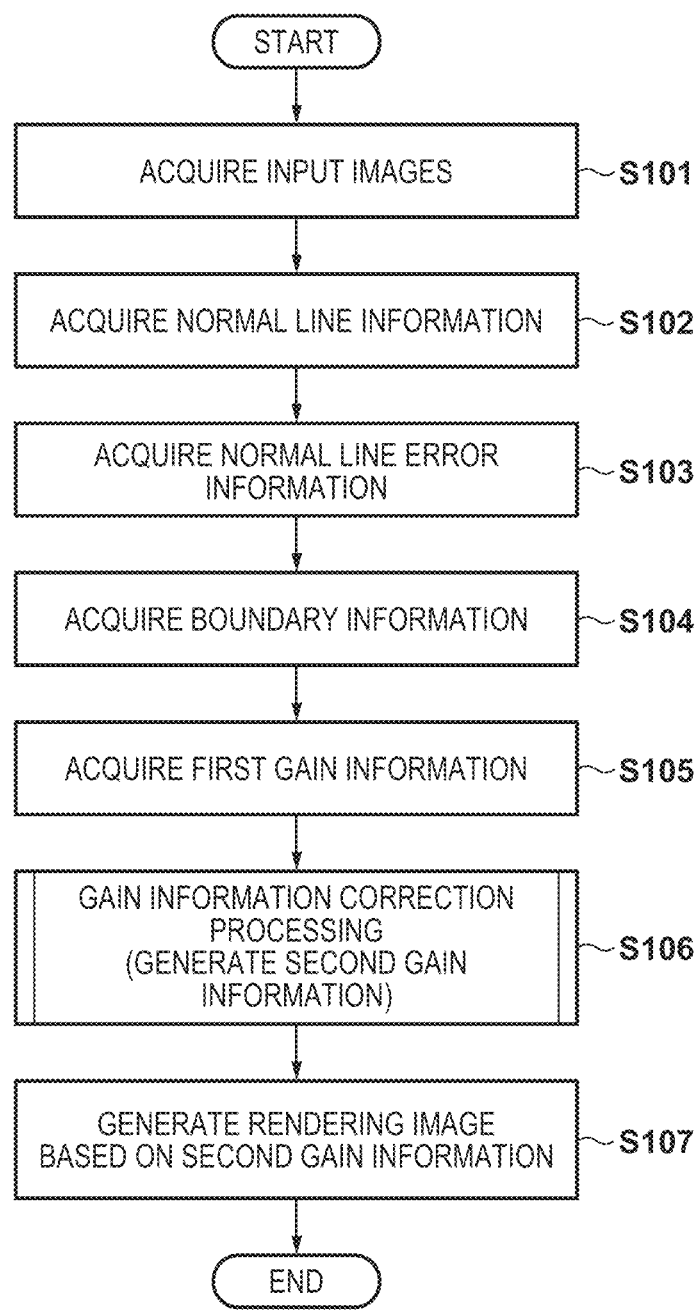
FIG. 3 is a flowchart of rendering processing.

The rendering processing of the present embodiment will be described with reference to FIG. 3. FIG. 3 is a flowchart of the rendering processing. The rendering processing of the present embodiment is executed by the system control unit 110 and the image processing unit 104, in accordance with a processing program serving as a computer program. Note that the processing program is stored in a computer-readable storage medium (internal memory of system control unit 110, etc.), for example.

In step S101, the system control unit 110 controls the image capturing control unit 107 to capture an image of the subject at least three times. Each time image capturing is performed, the system control unit 110 controls the irradiation light source control unit 106 to turn on a differently positioned light source of the light source unit 200. The input image acquisition unit 104a acquires, as input images, at least three captured images generated by image capturing being performed at least three times.

Note that, in the case of acquiring normal line information with a photometric stereo method that postulates a diffuse reflectance model such as Lambertian reflectance in step S102 described later, diffuse reflection images obtained by removing the specular reflection component from captured images may be used as input images. In order to acquire diffuse reflection images obtained by removing the specular reflection component from captured images, a technique that applies a dichromatic reflectance model can be used, for example. However, the technique of removing the specular reflection component from captured images is not limited thereto, and it is possible to use various techniques.

In step S102, the normal line information acquisition unit 104b acquires normal line information (information indicating the normal line distribution in the shooting range) and reflectance. In the present embodiment, the normal line information acquisition unit 104b acquires the normal line information and reflectance of the subject, using at least three input images acquired by the input image acquisition unit 104a in step S101. The normal line information and reflectance are computed based on the change in luminance information that depends on the light source position, using the photometric stereo method.

In step S103, the image processing unit 104 acquires normal line error information that is used in order to specify normal line error regions (regions in which an error has occurred in the normal line distribution), based on the normal line information acquired in step S102. Normal line error information is information specifying pixels where a normal line error has occurred, among the pixels of the captured image, and is used for conditional branch determination in step S204 of FIG. 4A described later. In the present embodiment, the image processing unit 104 generates the rendering image under the same light source conditions as the captured image, using the normal line information acquired in step S102, and computes the difference between the rendering image and the captured image. The image processing unit 104 then determines a region of pixels where the difference is larger than a predetermined threshold value as a normal line error region, and acquires normal line error information.

In step S104, the boundary information acquisition unit 104c acquires boundary information of a plurality of subjects appearing within the image capturing angle of view (information indicating the boundary position between subjects in the shooting range). In the present embodiment, the boundary information acquisition unit 104c acquires boundary information, by measuring the distance to the subject using an image surface phase difference method for autofocus (AF), and detecting the change in object distance per pixel position (hereinafter, "flatness") based on this measurement value. More specifically, the boundary information acquisition unit 104c computes the object distance difference between adjacent pixels, determines a position where the positive/negative polarity of this distance difference reverses as the boundary between a plurality of subjects, and uses the determination result as boundary information.

Note that boundary information is not limited to the abovementioned flatness. For example, the boundary information acquisition unit 104c may detect the change in the aforementioned Lambertian diffuse reflectance pa of the object in formula 1 per pixel position, and use this detection result as boundary information. Alternatively, the boundary information acquisition unit 104c may use boundary information that is based on object detection information that uses deep learning or the like. Furthermore, the boundary information acquisition unit 104c may detect the change in color or luminance between a plurality of subjects per pixel position, and acquire this detection result as boundary information.

In step S105, the rendering unit 104d generates and acquires first gain information (first gain information indicating a first gain amount distribution) corresponding to the light source conditions (light source information prescribing a virtual light source) set in the information input unit 108, based on the normal line information acquired in step S102.

In step S106, the rendering unit 104d generates second gain information, by performing processing for correcting the first gain information (gain information correction processing). The gain information correction processing will be described in detail later. Here, the object of the gain information correction processing will be briefly described. The at least three input images used in order to acquire the normal line information in step S102 include specular reflection parts, shadow parts, or portions where interreflection has occurred due to the influence of surface shape. Thus, the first gain information will be derived using normal line information that includes a normal line error region in which there is an error in the normal line information. In the case where rendering processing is performed in accordance with such first gain information, an unnatural shadow part will possibly be formed in the normal line error region, and a failed re-lighting image will be generated. In view of this, the rendering unit 104d newly generates second gain information (second gain information indicating a second gain amount distribution), by performing gain information correction processing on the first gain information. By performing rendering processing using this second gain information, an unnatural shadow part is not formed, and it becomes possible to generate a re-lighting image without failure.

In step S107, the rendering unit 104d generates a rendering image, in accordance with the second gain information generated in step S106. The rendering image (re-lighting image) is acquired by performing predetermined gain processing on the pixel values of pixels where it is desired to add shadow based on the light source conditions (by applying gain that conforms to the second gain amount distribution), in a base image (image of the shooting range) such as an input image. As for the base image, an image that is based on at least three input images acquired in step S101 can be used. In the present embodiment, an image constituted by selecting a pixel value with the highest luminance value at each pixel position from at least three input images corresponding to differently positioned light sources is used as the base image. As for the gain processing for the rendering processing of the present embodiment, gain processing for reducing pixel values in the base image to a small value is performed, in order to form shadow parts that are based on the light source conditions. Note that, as for the base image of the present embodiment, images in different light source environments, such as ambient light images obtained by shooting without turning ON the light source, for example, may be used, without being limited to an image constituted by the abovementioned method.

Gain Information Correction Processing

Figure 4A:
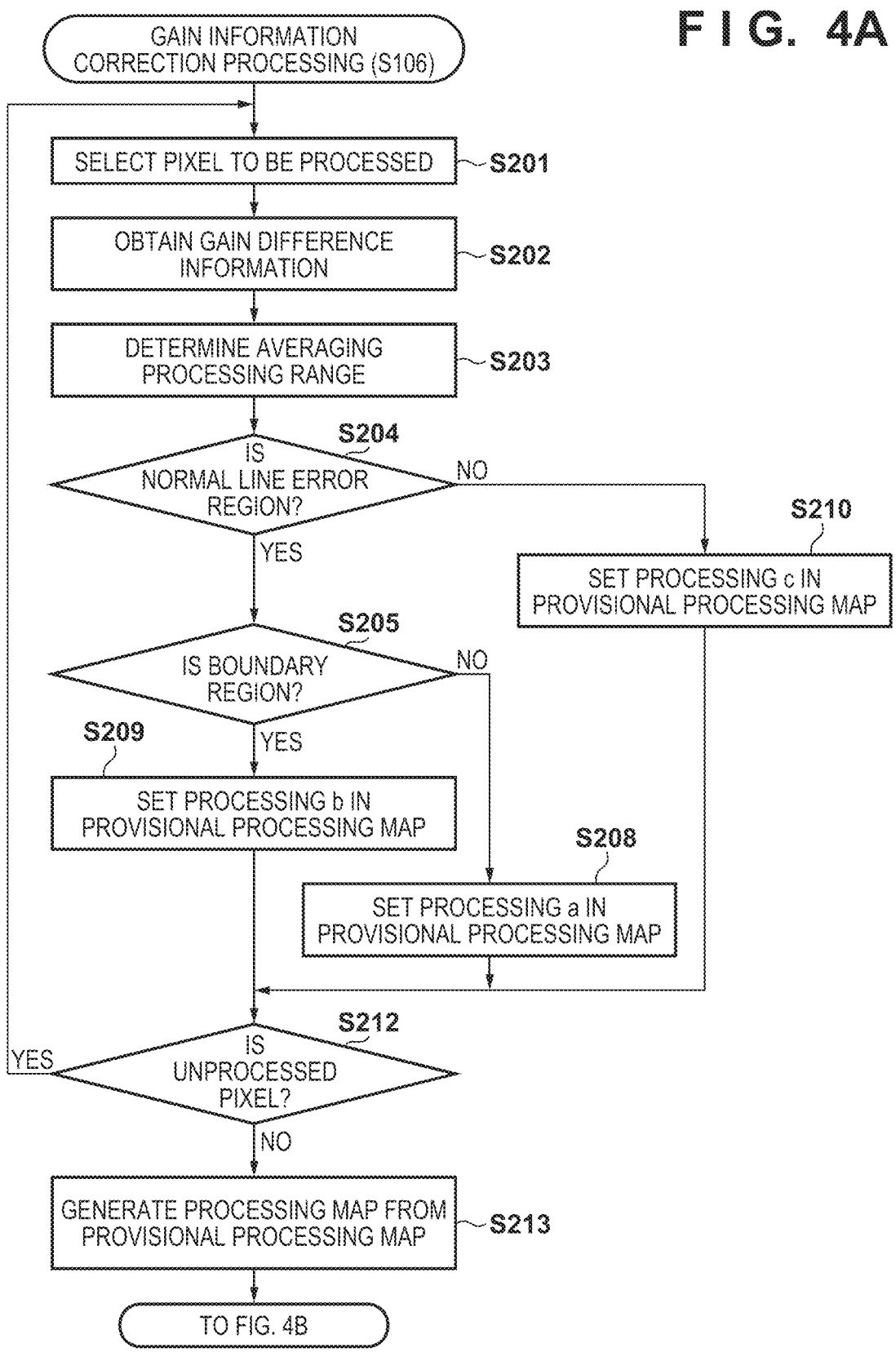
FIG. 4A is a flowchart showing gain information correction processing in detail.

The gain information correction processing will be described in detail, with reference to FIGS. 4A and 4B. In step S201, the rendering unit 104d selects a pixel to be processed (pixel of interest).

In step S202, the rendering unit 104d acquires gain difference information of the pixel to be processed, by computing the gain difference of the pixel to be processed with respect to an adjacent pixel based on the first gain information.

In step S203, the rendering unit 104d determines an averaging processing range of the pixel to be processed, based on the gain difference information acquired in step S202. The method of determining the averaging processing range will be described in detail later.

In step S204, the rendering unit 104d determines whether the pixel to be processed is a pixel in a normal line error region, based on the normal line error information acquired in step S103. If the pixel to be processed is a pixel in a normal line error region, the processing step advances to step S205, and if not the case, the processing step advances to step S210.

Here, the processing of step S210 will be described first. In step S210, the rendering unit 104d sets processing c in a position corresponding to the pixel to be processed in a provisional processing map. The provisional processing map is a map indicating the type of processing to be applied to each pixel position of the first gain information. The type of processing set in the provisional processing map is, however, provisional, and the type of processing that will ultimately be applied is set in a processing map described later. Accordingly, the provisional processing map is configured by the processing of step S210 to indicate that it is possible to execute processing c on the first gain information of the pixel to be processed.

Figure 7:
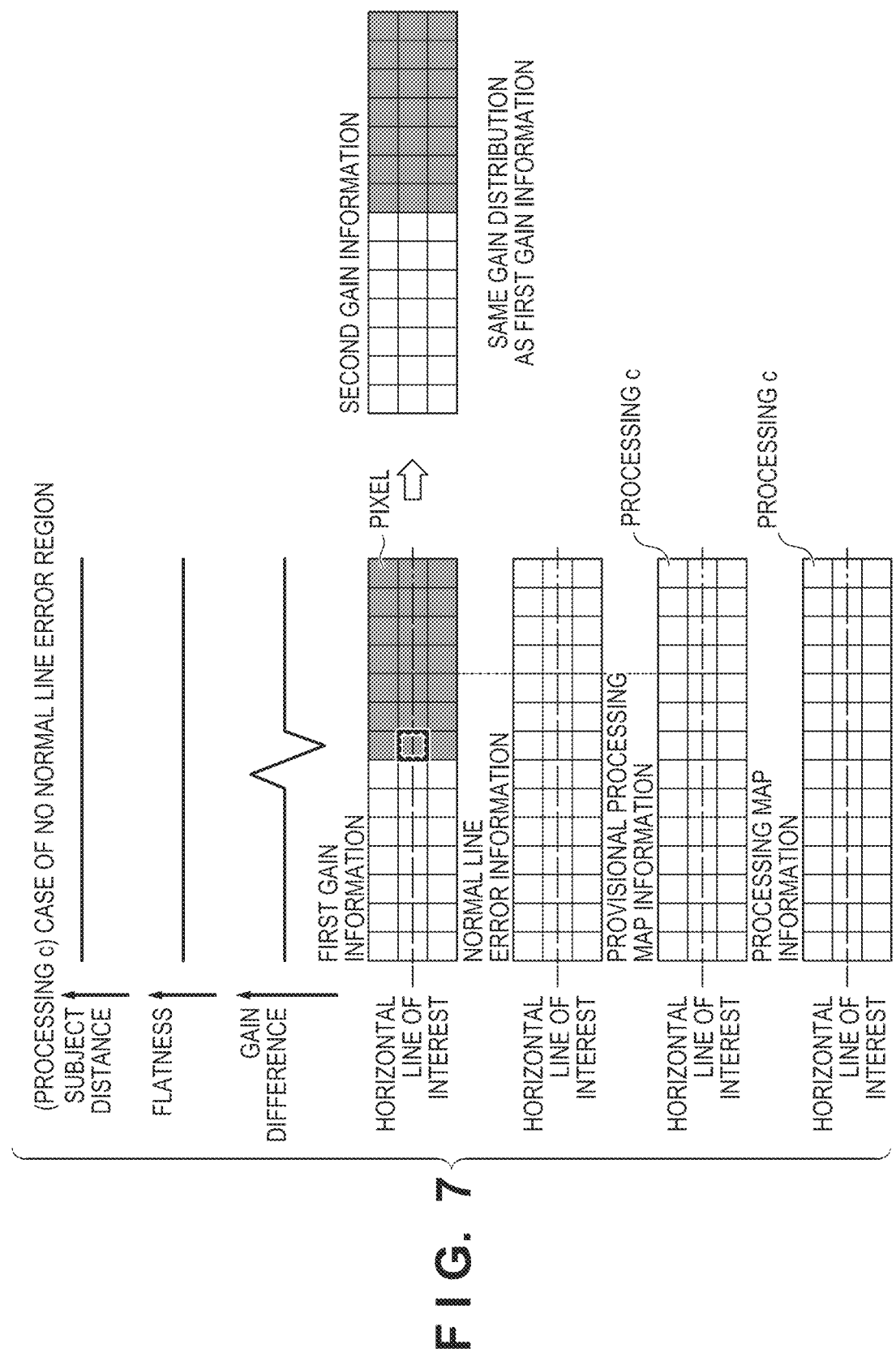
FIG. 7 is a diagram illustrating processing c in gain information correction processing.

Here, processing c will be described with reference to FIG. 7. FIG. 7 shows a state where a normal line error region does not exist, even though there is a gain difference in the first gain information. In FIG. 7, the gain amount is visually represented by the depth of color, in the regions showing the first gain information and the second gain information. Darker colored pixels indicate that a larger negative gain amount for forming shadow is applied. Under the region showing the first gain information, there is a region showing the normal line error information acquired in step S102, a region showing the provisional processing map, and a region showing the processing map generated in step S213 described later. Also, in FIG. 7, the change in gain difference between adjacent pixels on a horizontal line of interest is indicated by a graph, with the vertical axis of the graph being gain difference.

In the region showing normal line error information, darkly colored pixels indicate that a normal line error has occurred. In the example in FIG. 7, all the pixels are white, and thus there is no normal line error region. Accordingly, processing c is set in the provisional processing map by the processing of step S210 for any pixel to be processed. Processing c is also set for each pixel in the processing map that is generated in step S213 described later. Note that, in the regions showing the provisional processing map and the processing map, white pixels indicate pixels for which processing c is set.

Processing c is processing for setting the second gain information to the same gain amount as the first gain information. Accordingly, in FIG. 7, there is no change between the first gain information and the second gain information.

Here, the case where the pixel to be processed is a pixel in a normal line error region (case where the processing step advances from step S204 to step S205) will be described, with reference again to FIG. 4A.

In step S205, the rendering unit 104d determines whether the pixel to be processed is a pixel in a boundary region, based on the boundary information acquired in step S104. If the pixel to be processed is a pixel in a boundary region, the processing step advances to step S209, and if not the case, the processing step advances to step S208.

In step S208, the rendering unit 104d sets processing a in the position corresponding to the pixel to be processed in the provisional processing map. In step S209, the rendering unit 104d sets processing b in the position corresponding to the pixel to be processed in the provisional processing map. Processing a and processing b will be described in detail later.

In step S212, the rendering unit 104d determines whether there are any unprocessed pixels. If there are any unprocessed pixels, the processing step returns to step S201. The rendering unit 104d then selects one of the unprocessed pixels as the next pixel to be processed. Accordingly, the processing of steps S201 to S212 is performed on each pixel. When processing on all the pixels is completed (i.e., it is determined in step S212 that there are no unprocessed pixels), the processing step advances to step S213.

In step S213, the rendering unit 104d generates a processing map, based on the provisional processing map in which the type of provisional processing is set in steps S208 to S210, the averaging processing range determined in step S203, and a processing b range threshold value th. The method of generating the processing map will be described in detail later.

Figure 4B:
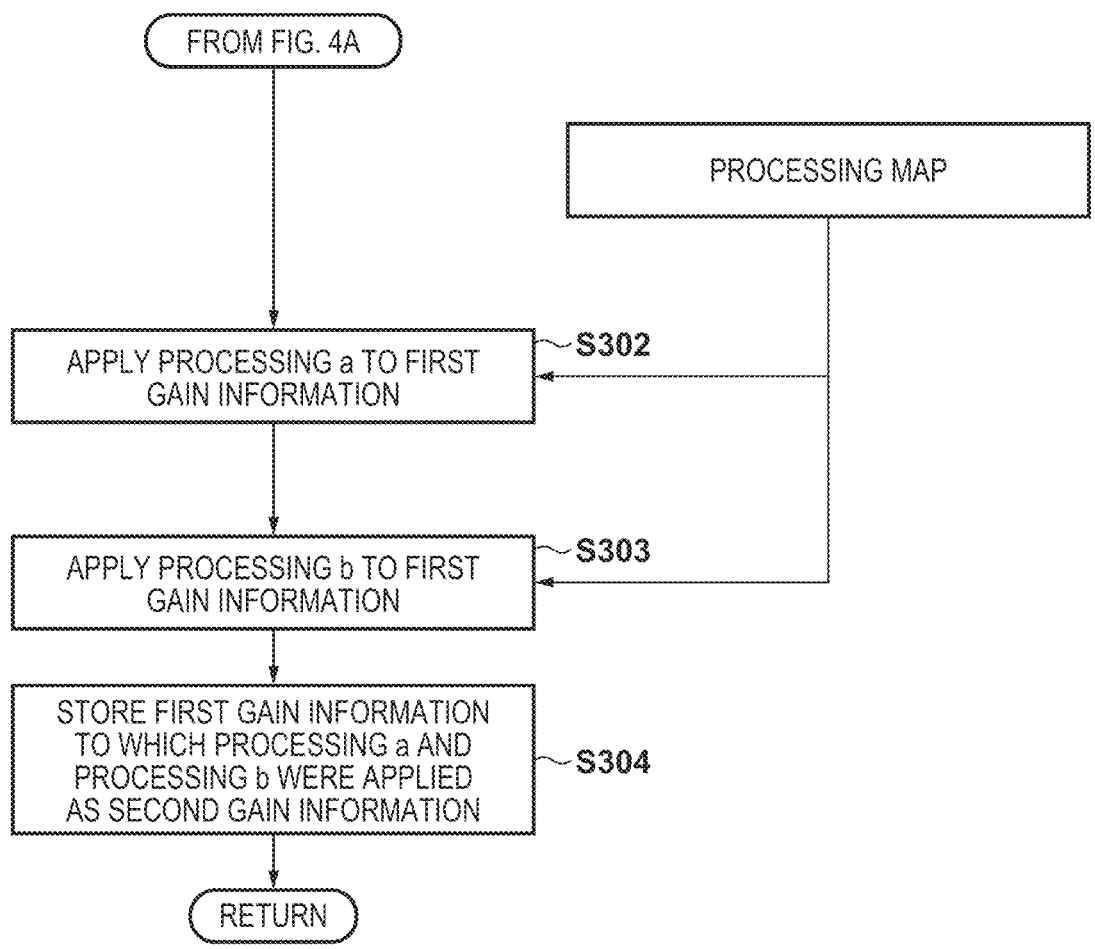
FIG. 4B is a flowchart showing gain information correction processing in detail.

Next, in step S302 of FIG. 4B, the rendering unit 104d executes processing a, based on the processing map generated in step S213. Processing a will be described in detail later.

Thereafter, in step S303, the rendering unit 104d executes processing b, based on the processing map generated in step S213. Processing b will be described in detail later.

In step S304, the rendering unit 104d stores, as second gain information, the first gain information to which processing a and processing b have been successively applied in steps S302 and S303.

Due to the above processing, the gain information correction processing in step S106 of FIG. 3 is completed, and the second gain information is acquired. As aforementioned, the second gain information thus obtained is then used for the rendering processing by the rendering unit 104d in step S107.

Figure 5:
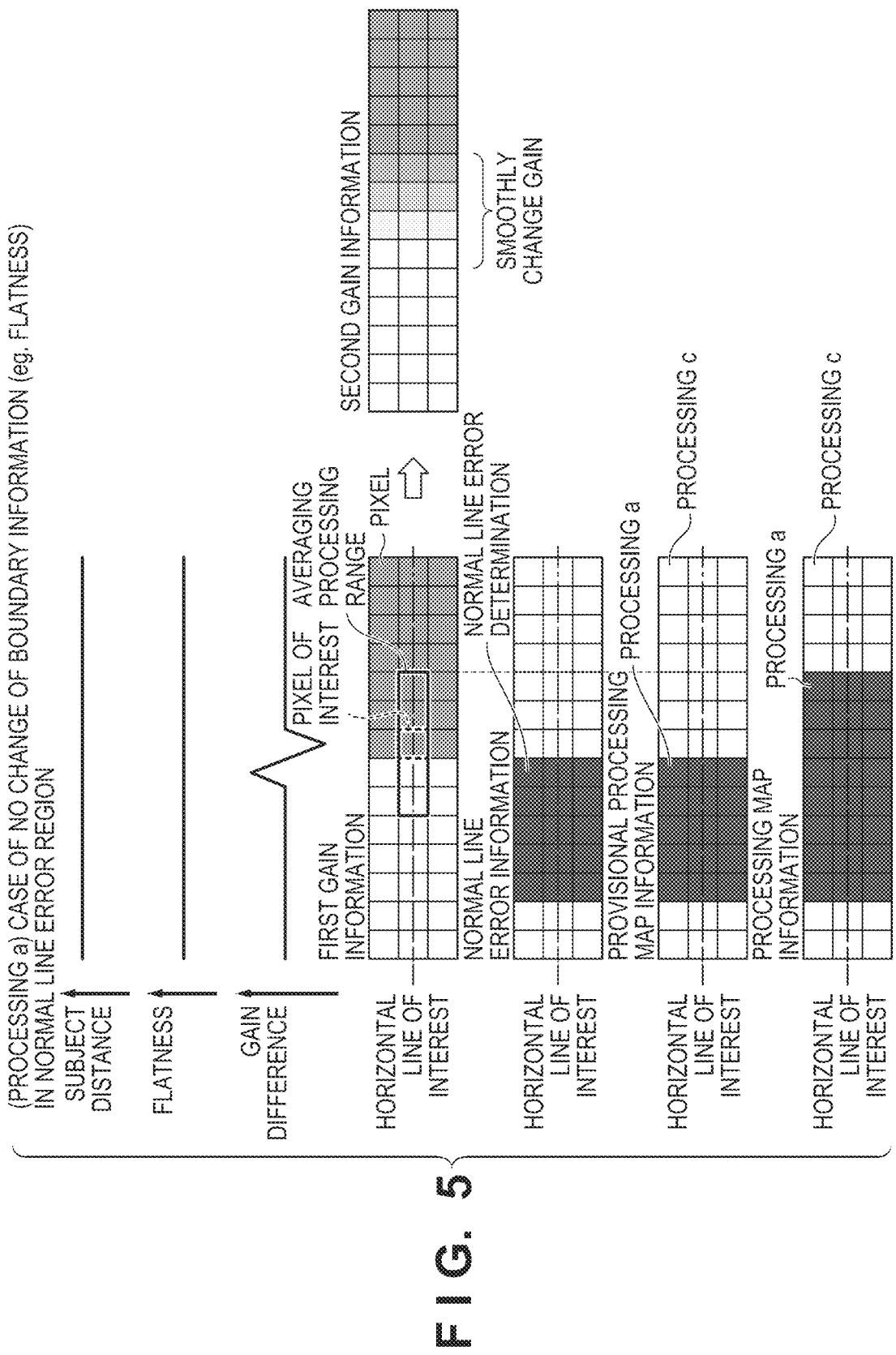
FIG. 5 is a diagram illustrating processing a in gain information correction processing.
Figure 6:
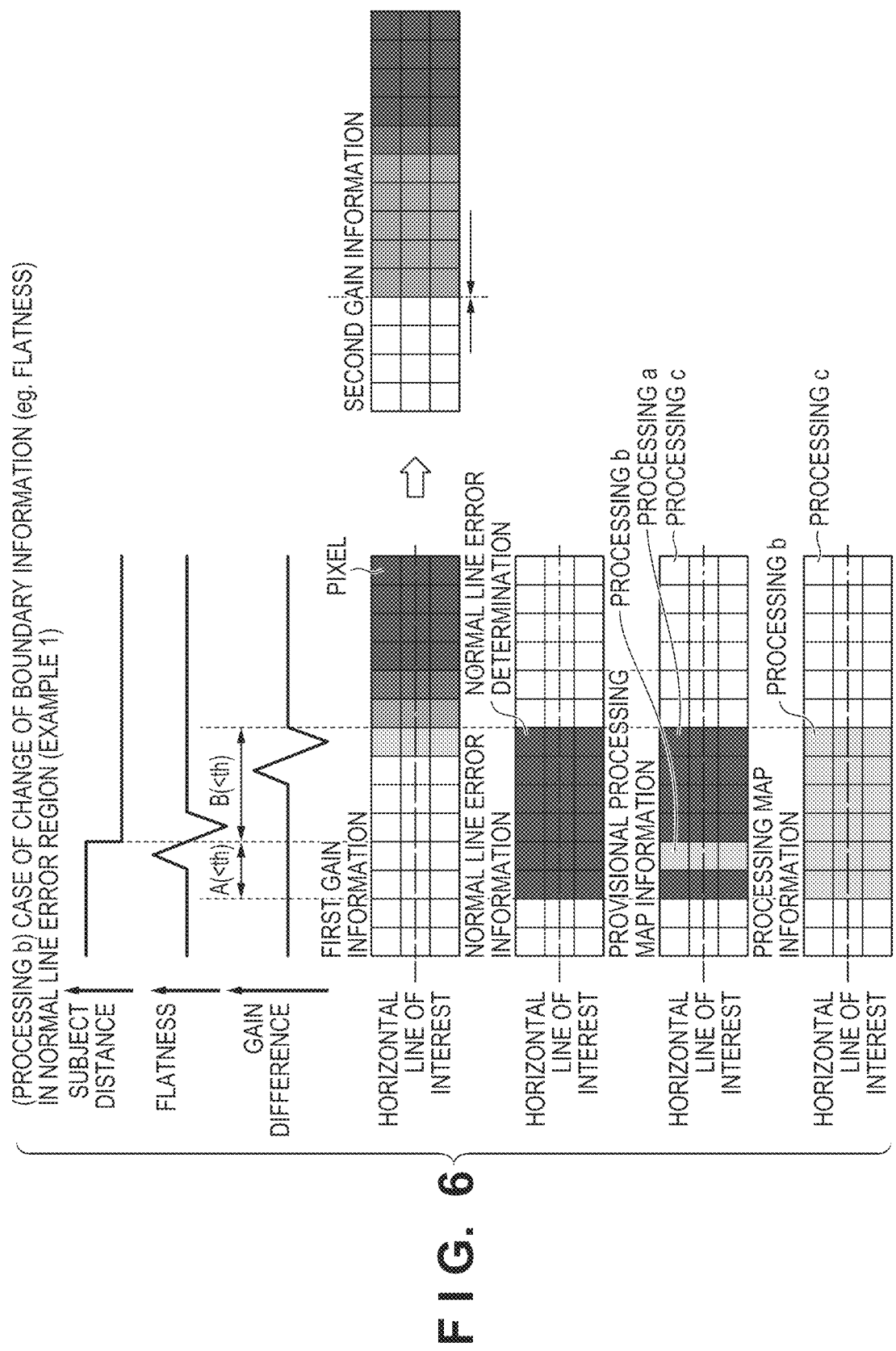
FIG. 6 is a diagram illustrating processing b in gain information correction processing (Example 1).

Here, processing a, processing b and the processing map generation processing will be described, with reference to FIGS. 5, 6, 8A to 8C and 11. FIG. 5 is a diagram illustrating processing a, and FIGS. 6 and 11 are diagrams illustrating processing b. In the examples shown in FIGS. 5, 6 and 11, the first gain information has a gain step between adjacent pixels, and there is a normal line error region that includes the position of the gain step or contacts the position of the gain step. On the other hand, FIG. 5 shows the case where there is no change in the flatness corresponding to the boundary information in the normal line error region (no boundary), and FIGS. 6 and 11 show the case where there is a change in the flatness in the normal line error region (boundary exists).

Initially, processing a will be described with reference to FIG. 5. In the regions showing the provisional processing map and the processing map in FIG. 5, the dark colored pixels indicate pixels for which processing a is set. The rendering unit 104d generates the processing map based on the provisional processing map, and, for each pixel for which processing a is set in the processing map, implements processing a on the first gain amount from the first gain information. Processing a is processing for deriving a second gain amount for the second gain information, by implementing smoothing processing that uses the first gain amounts of the pixel of interest (pixel on which processing a is implemented), and neighboring pixels thereof. In the following description, the rendering unit 104d performs averaging processing as the smoothing processing, but is not limited thereto and may perform other types of smoothing processing. In the present embodiment, processing for computing the second gain amount of the pixel of interest is performed, by implementing averaging processing through an addition average on the first gain amounts of pixels in the region described as the averaging processing range that includes the pixel of interest, such as shown in FIG. 5.

Figure 8A:
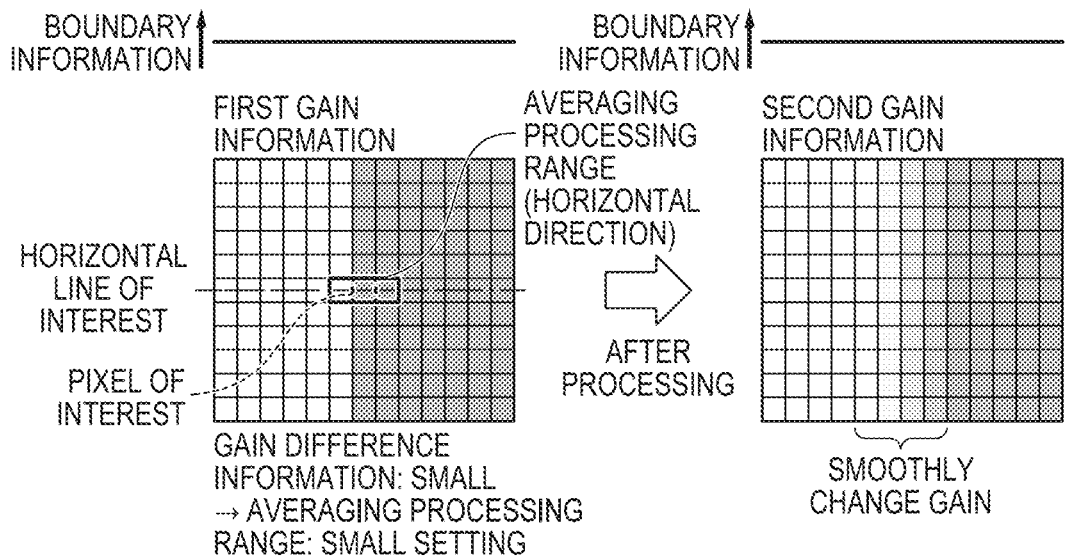
FIGS. 8 A to 8C are diagrams illustrating a method for determining an averaging processing range (smoothing range) in detail.
Figure 8B:
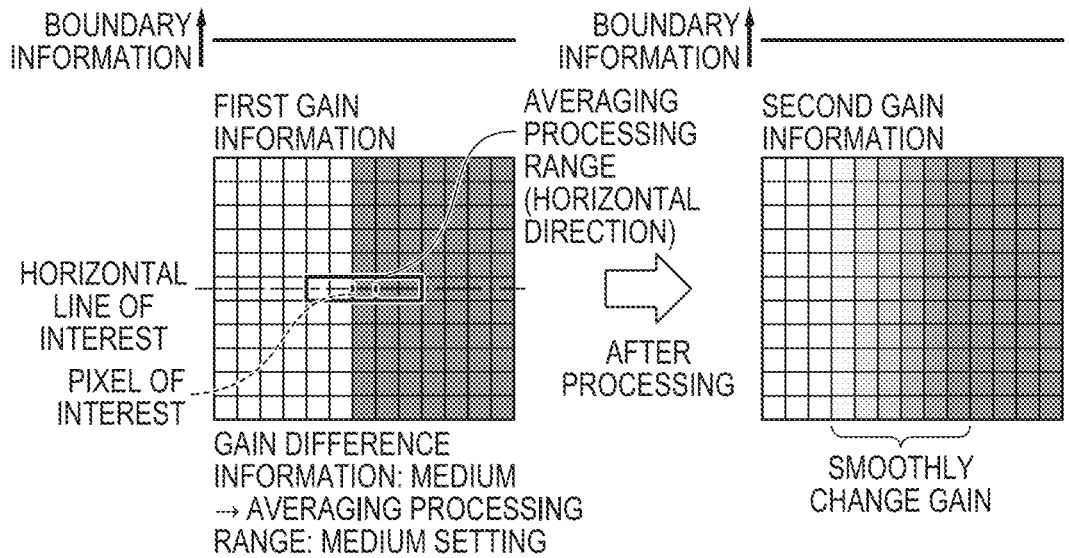
Figure 8C:
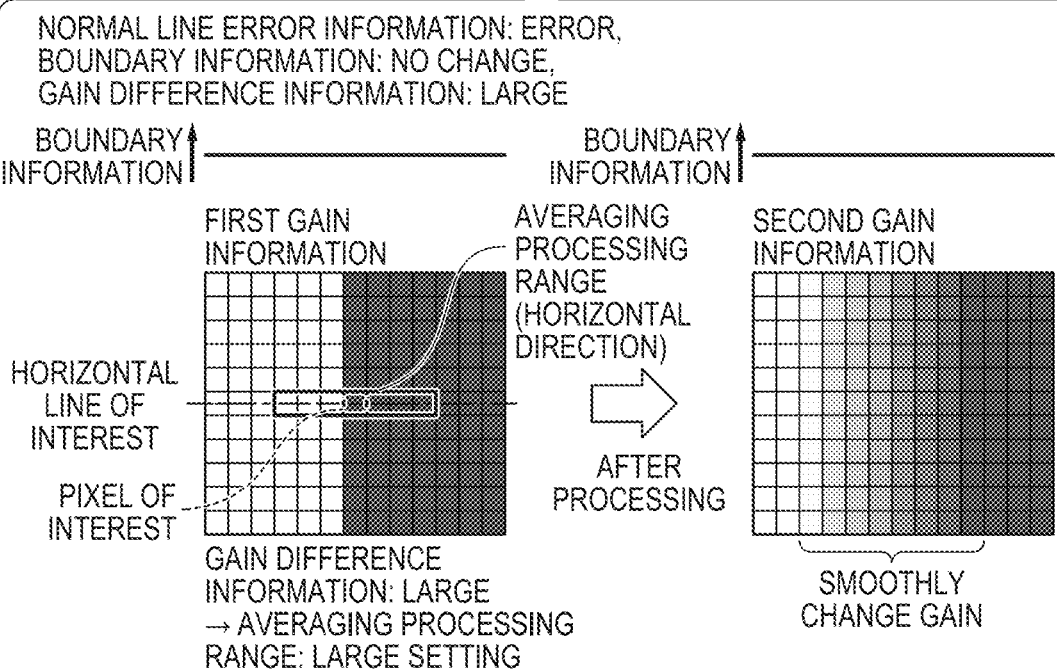

Here, the method of determining the averaging processing range (smoothing range) will be described in detail, with reference to FIGS. 8A to 8C. The gain step in the first gain amount of the first gain information is shown to successively increase in FIGS. 8A, 8B and 8C. A larger horizontal averaging processing range is also shown to be set following an increase in this gain step.

Accordingly, the averaging processing range that is determined for a second position in which the difference in gain amount (gain step) is a second value is larger than the averaging processing range that is determined for a first position in which the gain step is a first value that is smaller than the second value. A smooth change can thereby be realized in shadow parts in a normal line error region that has undergone re-lighting image formation, regardless of the size of the gain step. Also, the occurrence of unnatural shadow with high contrast and tone jump in shadow parts can be suppressed.

In the processing map generation processing of step S213, the rendering unit 104d generates a final processing map, by newly setting the region of processing a with consideration of the averaging processing range, based on the averaging processing range (see FIGS. 8A to 8C) determined in step S203 and the region of the provisional processing map in which processing a was set in step S208.

Note that the present embodiment refers to setting of a horizontal averaging processing range, assuming that the gain step occurs horizontally. However, the present invention is not limited thereto, and, in the case where the gain step occurs vertically, a larger vertical averaging processing range need only be set following an increase in the gain step amount. Furthermore, in the case where there are gain steps horizontally and vertically, and the numbers of taps of an averaging filter corresponding to the averaging processing range in each direction are fH and fV, for example, averaging processing may be implemented with an fH×fV averaging filter. Also, averaging processing is not limited to being implemented with a simple addition average, and averaging processing may be performed with pixels weighted more heavily as they approach the pixel of interest.

Next, processing b will be described with reference to FIGS. 6 and 11. The difference between FIGS. 6 and 11 is the difference in range of the normal line error region. FIG. 6 shows the case where a distance B from the pixels of processing b in the provisional processing map to the pixels at the right end of the normal line error region (distance from the boundary position to a position adjacent to the normal line error region) is smaller than the processing b range threshold value th (B<th). On the other hand, FIG. 11 shows the case where the distance B from the pixels of processing b in the provisional processing map to the pixels at the right end of the normal line error region is larger than the processing b range threshold value th (B>th). Note that, in FIGS. 6 and 11, a distance A from the pixels of processing b in the provisional processing map to the pixels at the left end of the normal line error region is smaller than the processing b range threshold value th. Note also that the processing b range threshold value th may be a value determined in advance, and may also be a value changeable by the user through the information input unit 108.

As shown in FIGS. 6 and 11, in the case of processing horizontally, non-normal line error regions adjacent to the normal line error region are, naturally, formed at both ends of the normal line error region. FIGS. 6 and 11 also show that the position at which the flatness, which is boundary information, changes is within the normal line error region. Processing b is set for the boundary region in the provisional processing map, based on this boundary information. In the regions showing the provisional processing map and the processing map in FIGS. 6 and 11, the moderately dark colored pixels indicate pixels for which processing b is set.

In the case of B<th shown in FIG. 6 (case where the distance is less than the threshold value), the rendering unit 104d performs processing for setting the first gain amounts of pixels in the non-normal line error regions adjacent to each normal line error region, as the second gain amount, on the pixels of the normal line error regions divided in two by the pixels of processing b in the provisional processing map. That is, the rendering unit 104d replaces the gain amount of the region corresponding to the normal line error region in the first gain amount distribution shown by the first gain information with the gain amount of the position adjacent to the normal line error region. This is performed since there could possibly be a change in material after the position at which the flatness, which is boundary information, changes. In other words, the Lambertian diffuse reflectance a in the aforementioned formula 1 could possibly change after the position at which the boundary information (flatness) changes, and this needs to be taken into consideration when setting of the abovementioned second gain amount of the normal line error region.

On the other hand, in the case of B>th shown in FIG. 11 (case where the distance is not less than the threshold value), the rendering unit 104d performs processing for setting the first gain amount, obtained after execution of processing a, of pixels adjacent to the pixel of the distance th from the boundary, as the second gain amount, on the pixels of the normal line error regions divided in two by the pixels of processing b in the provisional processing map. That is, the rendering unit 104d replaces the gain amount of the region that is included in a distance range less than or equal to the threshold value from the boundary position in the first gain amount distribution shown by the first gain information with the gain amount of the position adjacent to the region that is included in this distance range.

Note that the present embodiment describes the case of processing horizontally, but is not limited thereto, and the second gain amount can also be derived in the vertical direction by processing similarly to in the horizontal direction. Also, in the case where there are gain steps horizontally and vertically, and the second gain amount is derived in each direction, an arithmetic mean of the two gain amounts may be used as the second gain amount.

As described above, according to the first embodiment, the image capturing apparatus 1 acquires light source information specifying a virtual light source, a normal line information indicating a normal line distribution in the shooting range, and normal line error information indicating a normal line error region in which an error has occurred in the normal line distribution. Also, the image capturing apparatus 1 generates first gain information indicating a first gain amount distribution, based on the light source information and the normal line information. The image capturing apparatus 1 then generates second gain information indicating a second gain amount distribution, by performing smoothing processing on the gain amount of the region, which corresponds to the normal line error region, in the first gain amount distribution, as shown in FIG. 5, for example. Thereafter, the image capturing apparatus 1 adds the effect of the virtual light source to the image of the shooting range, by applying gain that conforms to the second gain amount distribution to the image. Note that the image capturing apparatus 1 may generate second gain information indicating the second gain amount distribution, by replacing the gain amount of the region, which corresponds to the normal line error region, in the first gain amount distribution with the gain amount of the position adjacent to the normal line error region, after performing the abovementioned smoothing processing, as shown in FIG. 6, for example.

It thereby becomes possible to generate a virtual light source image (re-lighting image) having natural shadow, and to suppress degradation in the image quality of the virtual light source image caused by the normal line error region, as shown in FIG. 10B, for example.

Note that the above description illustrates a configuration that corrects gain information generated based on normal line information associated with a normal line error region, based on the normal line error region. However, the image capturing apparatus 1 (information processing apparatus) may correct the normal line information associated with the normal line error region itself, based on the normal line error region, instead of correcting the gain information. In this case, the image capturing apparatus 1 generates second normal line information indicating the second normal line distribution, by performing smoothing processing on the normal line of the normal line error region, in a first normal line distribution (normal line distribution in the shooting range) shown by the normal line information (first normal line information) acquired in step S102 of FIG. 3. With regard to the specific method of smoothing processing, a similar method to the smoothing processing on the gain amount described with reference to FIG. 5 can be used. Also, the image capturing apparatus 1 may replace the normal line based on the boundary position, by a similar method to replacement processing on the gain amount described with reference to FIGS. 6 and 11, after performing smoothing processing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-186748, filed Nov. 9, 2020 which is hereby incorporated by reference herein in its entirety.

What is claimed is:

1. An image processing apparatus comprising at least one processor and/or at least one circuit which functions as:
   an acquisition unit configured to acquire light source information specifying a virtual light source, normal line information indicating a normal line distribution in a shooting range, and normal line error information indicating a normal line error region in which an error has occurred in the normal line distribution;
   a first generation unit configured to generate first gain information indicating a first gain amount distribution, based on the light source information and the normal line information;
   a second generation unit configured to generate second gain information indicating a second gain amount distribution, by performing smoothing processing on a gain amount of a region, which corresponds to the normal line error region, in the first gain amount distribution; and an addition unit configured to add an effect of the virtual light source to an image of the shooting range, by applying a gain conforming to the second gain amount distribution to the image.

2. The image processing apparatus according to claim 1, wherein the second generation unit determines, based on a difference in gain amount between positions in the region, which corresponds to the normal line error region, in the first gain amount distribution, a smoothing range of each of the positions in the smoothing processing, and the smoothing range determined for a second position for which the difference in gain amount is a second value is larger than the smoothing range determined for a first position for which the difference in gain amount is a first value smaller than the second value.

3. The image processing apparatus according to claim 1, wherein the acquisition unit further acquires boundary information indicating a boundary position between subjects in the shooting range, and in a case where the normal line error region includes the boundary position, the second generation unit generates the second gain information indicating the second gain amount distribution, by replacing the gain amount of the region, which corresponds to the normal line error region, in the first gain amount distribution with a gain amount of a position adjacent to the normal line error region, after performing the smoothing processing.

4. The image processing apparatus according to claim 3, wherein the acquisition unit acquires, as the boundary information, information indicating a change in diffuse reflectance per pixel position, information indicating a change in object distance per pixel position, object detection information, information indicating a change in color per pixel position, or information indicating a change in luminance per pixel position.

5. The image processing apparatus according to claim 1, wherein the acquisition unit further acquires boundary information indicating a boundary position between subjects in the shooting range, and in a case where the normal line error region includes the boundary position, the second generation unit
 determines whether a distance from the boundary position to a position adjacent to the normal line error region is less than a threshold value,
 in a case where the distance is less than the threshold value, generates the second gain information indicating the second gain amount distribution, by replacing the gain amount of the region, which corresponds to the normal line error region, in the first gain amount distribution with a gain amount of the position adjacent to the normal line error region, after performing the smoothing processing, and
 in a case where the distance is not less than the threshold value, generates the second gain information indicating the second gain amount distribution, by replacing a gain amount of a region included in a distance range less than or equal to the threshold value from the boundary position in the first gain amount distribution with a gain amount of a position adjacent to the region included in the distance range, after performing the smoothing processing.

6. An image capturing apparatus comprising:
 the image processing apparatus according to claim 1; and
 an image sensor configured to generate the image.

7. An information processing apparatus comprising at least one processor and/or at least one circuit which functions as:
 an acquisition unit configured to acquire first normal line information indicating a first normal line distribution which is a normal line distribution in a shooting range and normal line error information indicating a normal line error region in which an error has occurred in the first normal line distribution; and
 a generation unit configured to generate second normal line information indicating a second normal line distribution, by performing smoothing processing on a normal line of the normal line error region in the first normal line distribution.

8. An image processing method executed by an image processing apparatus, comprising:
 acquiring light source information specifying a virtual light source, normal line information indicating a normal line distribution in a shooting range, and normal line error information indicating a normal line error region in which an error has occurred in the normal line distribution;
 generating first gain information indicating a first gain amount distribution, based on the light source information and the normal line information;
 generating second gain information indicating a second gain amount distribution, by performing smoothing processing on a gain amount of a region, which corresponds to the normal line error region, in the first gain amount distribution; and
 adding an effect of the virtual light source to an image of the shooting range, by applying a gain conforming to the second gain amount distribution to the image.

9. A non-transitory computer-readable storage medium which stores a program for causing a computer to execute an image processing method comprising:
 acquiring light source information specifying a virtual light source, normal line information indicating a normal line distribution in a shooting range, and normal line error information indicating a normal line error region in which an error has occurred in the normal line distribution;
 generating first gain information indicating a first gain amount distribution, based on the light source information and the normal line information;
 generating second gain information indicating a second gain amount distribution, by performing smoothing processing on a gain amount of a region, which corresponds to the normal line error region, in the first gain amount distribution; and
 adding an effect of the virtual light source to an image of the shooting range, by applying a gain conforming to the second gain amount distribution to the image.

* * * * *